(12) United States Patent
Jayakumar et al.

(10) Patent No.: US 12,488,231 B2
(45) Date of Patent: Dec. 2, 2025

(54) SYSTEM AND METHOD FOR TAG-DIRECTED DEEP-LEARNING-BASED FEATURES FOR PREDICTING EVENTS AND MAKING DETERMINATIONS

(71) Applicant: PayPal, Inc., San Jose, CA (US)

(72) Inventors: Suraj Jayakumar, San Jose, CA (US); Amit Kumar Bansal, Sunnyvale, CA (US); Chao Cheng, Milpitas, CA (US)

(73) Assignee: PAYPAL, INC., San Jose, CA (US)

( * ) Notice: Subject to any disclaimer, the term of this patent is extended or adjusted under 35 U.S.C. 154(b) by 1152 days.

(21) Appl. No.: 17/011,872

(22) Filed: Sep. 3, 2020

(65) Prior Publication Data

US 2022/0067510 A1 Mar. 3, 2022

(51) Int. Cl.
| | | |
|---|---|---|
| *G06N 3/08* | (2023.01) | |
| *G06F 16/2458* | (2019.01) | |
| *G06N 3/044* | (2023.01) | |
| *G06Q 30/018* | (2023.01) | |
| *G06Q 40/12* | (2023.01) | |
| *G06Q 40/03* | (2023.01) | |

(52) U.S. Cl.
CPC ........... *G06N 3/08* (2013.01); *G06F 16/2474* (2019.01); *G06N 3/044* (2023.01); *G06Q 30/0185* (2013.01); *G06Q 40/12* (2013.12); *G06Q 40/03* (2023.01)

(58) Field of Classification Search
CPC ...... G06N 3/08; G06N 3/044; G06F 16/2474; G06Q 30/0185; G06Q 40/12; G06Q 40/03
See application file for complete search history.

(56) References Cited

U.S. PATENT DOCUMENTS

| | | | |
|---|---|---|---|
| 2017/0030080 A1 | 2/2017 | Sacks et al. | |
| 2018/0122004 A1* | 5/2018 | Stewart | G06Q 40/02 |
| 2019/0325514 A1* | 10/2019 | Hong | G06Q 40/03 |
| 2019/0378050 A1* | 12/2019 | Edkin | G06N 20/20 |
| 2020/0012718 A1* | 1/2020 | Kung | G06N 20/00 |
| 2020/0294128 A1* | 9/2020 | Cella | H04L 9/3239 |
| 2020/0357060 A1* | 11/2020 | Dalinina | G06F 18/2113 |
| 2021/0406266 A1* | 12/2021 | Chan | G06F 21/6245 |
| 2022/0405580 A1* | 12/2022 | Zheng | G06F 18/24147 |

OTHER PUBLICATIONS

Yang et al. ("DeepCredit: Exploiting User Cickstream for Loan Risk Prediction in P2P Lending", CWSM 2018) (Year: 2018).*

(Continued)

*Primary Examiner* — Imad Kassim
(74) *Attorney, Agent, or Firm* — Haynes and Boone, LLP

(57) ABSTRACT

Methods and systems are presented for tagging an account associated with a user based on a predicted likelihood of an event associated with the user. A set of features is determined for data associated with the user. Values from the data are aggregated over time intervals for each feature to create time series data. The time series data is used as input to a neural network configured to accept input with the determined features. A predictive value indicating the likelihood of an event associated with the user is received from the neural network and used to determine whether to tag a user account. Determinations regarding the user are made based on the existence of absence of a tag on the user's account.

20 Claims, 5 Drawing Sheets

(56) References Cited

OTHER PUBLICATIONS

Nandhini et al. ("An Assessment and Methodology for Fraud Detection in Online Social Network", ICONSTEM 2016) (Year: 2016).*
Stewart et al. ("Credit risk assessment with a multistage neural network ensemble learning approach", Expert Systems with Applications 34 (2008) 1434-1444) (Year: 2008).*
Wang et al. ("A hybrid ensemble approach for enterprise credit risk assessment based on Support Vector Machine", 2012) (Year: 2012).*
Chen et al. ("Incorporating Corporation Relationship via Graph Convolutional Neural Networks for Stock Price Prediction", CIKM'18, Oct. 22-26, 2018) (Year: 2018).*

* cited by examiner

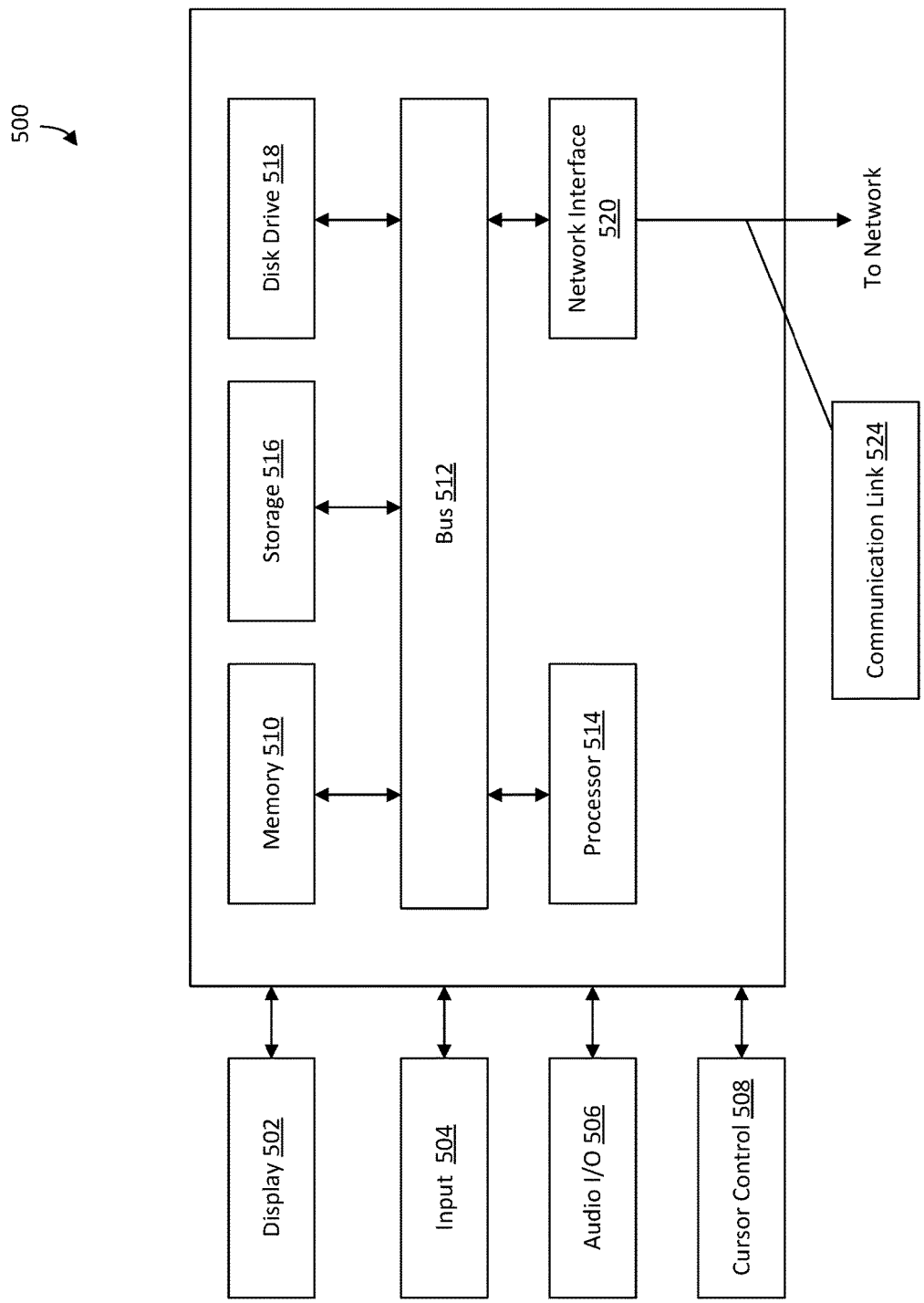

SYSTEM AND METHOD FOR TAG-DIRECTED DEEP-LEARNING-BASED FEATURES FOR PREDICTING EVENTS AND MAKING DETERMINATIONS

BACKGROUND

The present specification relates to predicting events associated with a user through tag-directed deep learning and making determinations based on the predictions.

RELATED ART

A service provider may wish to predict the likelihood of an event associated with a user before making a determination related to the user. For example, a provider of financial services may wish to predict the likelihood of a user of its services defaulting on a debt before extending a line of credit to the user. Similarly, the service provider may wish to predict the likelihood of a user responding to an offer before communicating the offer to the user. Predicting whether the user will respond to the offer may reduce the likelihood of inconveniencing the user with an unsolicited message the user is likely to ignore, as well as save service provider resources in sending the offer.

Service providers may use various models with human-derived parameters to attempt to make such predictions. For example, the financial services provider may create a model that considers aggregate data from a consumer's transaction history (e.g., credit card and bank account usage patterns) over a period of time (e.g., using time series data) to predict the risk of a consumer defaulting on a loan. Based on the prediction, the service provider may make decisions on whether to offer credit to the consumer, and what the terms of the offer should be. The sheer number of potential parameters and possible combinations of those parameters makes discovering a combination of parameters that reliably predicts the event in question difficult, which may result in patterns relevant to the prediction being overlooked. For example, a combination of seemingly unrelated parameters may be highly indicative of a consumer being a credit risk. Overlooking such a combination may result in credit being extended to a consumer that is likely to default on payments. Conversely, a combination of parameters that results in over-aggressive identification of consumers as credit risks may result in credit-worthy consumers being declined for loans, and lost revenue for the service provider. Thus, there is a need for improved methods of accurately predicting events that can identify patterns indicative of the events based on numbers and combinations of parameters beyond what current methods allow.

BRIEF DESCRIPTION OF THE FIGURES

FIG. 5 is a block diagram of a system for implementing a device according to an embodiment of the present disclosure.

Figure 1:
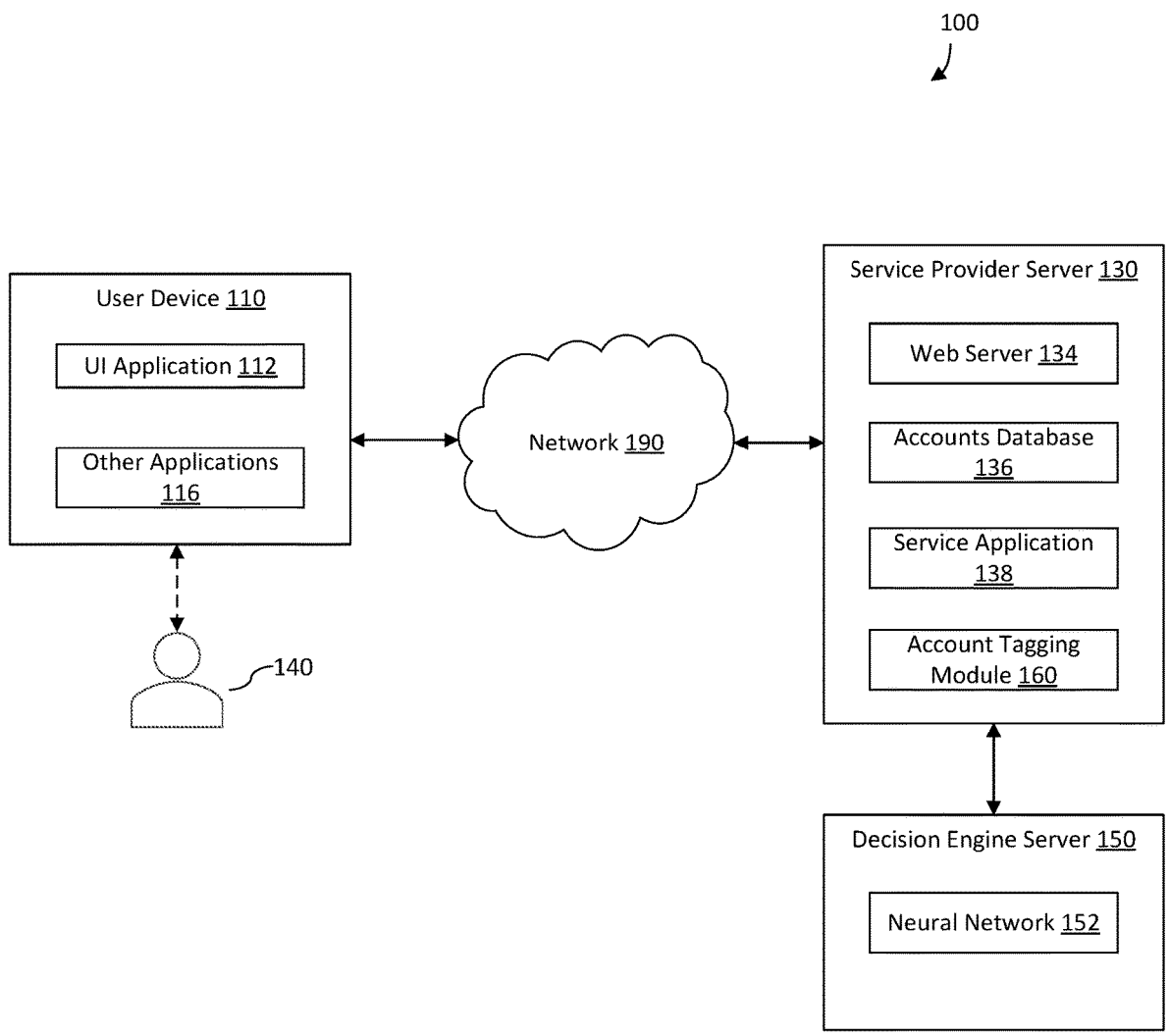
FIG. 1 is a block diagram illustrating a system for predicting events associated with a user and tagging the user's account based on the predictions according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for predicting events associated with a user and making decisions based on the predictions. As discussed above, a service provider may have decisions to make regarding a user before determining what action to take. These decisions can include, for example, whether to approve a user for a credit card or a loan, whether to mail or e-mail an offer to a user, or whether to approve a transaction initiated by the user. The service provider may use historical data accumulated based on the user's past interactions with the service provider. For example, a service provider of financial services may have a record of the user's financial transactions, including the number of transactions (e.g., purchases, sales, refunds, etc.), the amount of each transaction, and the parties involved in the transaction. The service provider may create various models using the data to predict the likelihood of the user defaulting or being delinquent on an obligation. For example, the service provider may build a model that aggregates various data points over time into a time series. The service provider may aggregate the total amount spent by the user in a month for every month over a 12-month period and aggregate the total amount of each chargeback (if any), and similarly aggregate the total amount of each refund to the user to create a time series of aggregate values. In combination with other values, the service provider may build a model that relies on the aggregate spending and refund amounts to determine, for example, whether to increase the user's credit line.

As another example, the service provider may maintain metrics related to the user's engagement with e-mail offers sent by the service provider. The service provider may have data including the number of messages sent, the number of messages viewed, and/or the number of messages for which the user followed a link provided in the message. The service provider may build a model based off the engagement data over a period and determine, based on the model, whether to send the user a specific offer or take a specific action. As discussed above, finding a combination of parameters for a model that generates accurate predictions is difficult, and the accuracy of predictions may be limited by a human's ability to consider a large number of parameters and discover relationships between the parameters indicative of the desired predictions.

Accordingly, embodiments of the present disclosure allow a service provider to make more accurate predictions about events associated with a user than traditional methods, without the limitations in the number of parameters or in discovering relationships among the parameters associated with traditional methods. This may result, for example, in improved decisions regarding offering credit to users, beneficial both to the service provider and the users. The improved predictions may also result in reducing unnecessary electronic communications from the service provider, thus reducing computing resources for the service provider associated with preparing and sending communications that are likely to not be of value to the service provider and/or the recipient.

In some embodiments, a system for predicting user events associated with a user may access data (also referred to as data items) associated with the user. The data may be based on historical data related to interactions between the user and the service provider. Each data item may be associated with a feature and a data item value. For example, for a provider of financial services, the provider may maintain a history of all the user's transactions. Each data item may correspond to a transaction, with a feature relating to the type of transaction (e.g., a purchase, a refund, a payment to the service provider, etc.) and an amount associated with the transaction (e.g., the amount of a purchase, refund, or payment). The system may determine aggregate values for a set of features based on the data. For example, the set of features may include a number of transactions (e.g., how many purchases or refunds the user completed), a transaction amount (e.g., the value of each purchase or refund), a number of payments, a payment amount, a number of reversed charges (also known as chargebacks), a reversed charge amount, a number of payment authorizations (i.e., the number of times a charge was accepted by the service provider), and/or a number of payment declinations (i.e., the number of times a charge was rejected by the service provider). An aggregate value may combine the value of data associated with the feature over a time interval. For example, one aggregate value may be the sum of all purchases in a week or the average amount (e.g., arithmetic mean) spent per day over a week, and another aggregate value may be the number of payment authorizations in a week. Each aggregate value may be standardized by subtracting the arithmetic mean of corresponding aggregate values from a set of training data and dividing the result by the standard deviation of the corresponding aggregate values from the training data. The system may then combine the aggregate values in a time series. For example, the aggregate values may be computed at 1-week intervals, and the time series may include 52 weeks of data.

The time series may be inputted to an input layer of a neural network (e.g., a long short-term memory (LSTM) neural network) and may be structured as matrix. Each column of the matrix may represent a feature of the set of features, and each row of the matrix may correspond to a time interval. For example, if the time series includes weekly data over a 52-week period, the first row of the matrix corresponds to week 1 (out of 52 weeks), and each column of the first row stores an aggregate value for a feature, computed over the first 1-week period. In some instances, the rows and columns of the matrix may also be reversed so that the columns correspond to time intervals and the rows correspond to features. The system may then receive from the neural network (e.g., from the output layer of the neural network) a predictive value predicting the likelihood of an event associated with the user. For example, the predictive value may predict the likelihood of the user defaulting on an obligation or becoming delinquent, the likelihood of the user being associated with fraudulent activity, or the likelihood of the user opening or responding to a message.

In some embodiments, the neural network may be trained using account records which have already been tagged (e.g., by a human or an automated system) as a result of the event which the neural network is configured to predict having already occurred. To train the neural network, the system may compile a plurality of records, each associated with a user account that has been tagged (e.g., by a human or an automated process) with a characteristic (e.g., high credit risk, low credit risk, highly responsive to marketing communications, etc., where "high," "low," and "highly" may be based on a number being above or below a threshold, which can vary based on the system or other factor) associated with the predictive value. For each record, the system may determine aggregate values for different features over time intervals based on data items associated with the record, as described above, to create time series data. The system may then feed each data time series to the neural network for training, along with time series data corresponding to user accounts which have not been tagged with the characteristic.

In some embodiments, the system may tag an account record associated with the user based on the predictive value received from the neural network. The system may determine whether the predictive value is at or above a threshold, and if so, store a tag indicating the predictive value is at or above the threshold in the account record. The system may tag account records periodically (e.g., as part of a scheduled task), or on-demand (e.g., when a request is received from a user for which the tag would be relevant). The system may receive a user request and decide whether to accept or reject the request based on the tag. For example, the neural network may be configured to predict the likelihood of user defaulting on a loan. Following the process described above for data associated with the user's account record, the neural network may output a value between 0 and 1, where 0 indicates certainty that the user will not default and 1 indicates certainty that the user will default. If the threshold is set to 0.5, for example, the system may tag the user as a credit risk if the predictive value from the neural network is at or above 0.5. When the user makes a request for a loan, the system may check the account record of the user to determine whether the user has been tagged as a credit risk. If so, the system may decline user's request for a loan or take another action, such as asking for additional data or limiting the amount of credit to offer. In some embodiments, the system may use the predictive value directly to make the determination. For example, the system may compute the predictive value as described above upon receiving a user request and determine whether to accept or reject the request based on whether the predictive value is at or above a threshold, even if the account has not been tagged with the characteristic associated with the predictive value. In such cases, the system may optionally tag the user's account once it has determined whether the predictive value is at or above the threshold. In some embodiments, the user's account may be tagged (and/or the determination of whether to accept or reject a request) may be based on the predictive value being at or below a threshold instead. For example, the network may tag the user's account as being associated with a low credit risk if the predictive value generated by the neural network is less than or equal to a threshold of 0.05.

In some embodiments, the predictive value may be used as an additional feature in other determinations or models. Furthermore, the output of intermediate layers of the neural network may also be used as features in other determinations or models. For example, the output of each node of the intermediate layer of the neural network preceding the output layer may represent a useful combination of the features included as input to the neural network. The outputs of these intermediate nodes may be used as features for a different neural network or predictive model.

FIG. 1 illustrates a system 100 for predicting events associated with a user and tagging the user's account based on the predictions, according to an embodiment of the present disclosure. The system 100 includes a service provider server 130 associated with a service provider, a user device 110, and a decision engine server 150, each of which may communicate with other components via a network 190. The network 190, in one embodiment, may be implemented as a single network or a combination of multiple networks. For example, in various embodiments, the network 190 may include the Internet and/or one or more intranets, landline networks, wireless networks, and/or other appropriate types of communication networks. In another example, the network 190 may comprise a wireless telecommunications network (e.g., cellular phone network) adapted to communicate with other communication networks, such as the Internet.

The user device 110, in one embodiment, may be utilized by a user 140 to interact with the service provider server 130 over the network 190. For example, the user 140 may use the user device 110 to log in to a user account with the service provider to access account services or conduct electronic transactions (e.g., account transfers or payments, purchase goods and/or services, sales of goods and/or services, receive payments of the sale, etc.) with the service provider server 130. The user 140 may also use the user device to request services offered by the service provider server (e.g., credit cards, loans, etc.). The user 140 represented here may be a natural person, a group of people, a community, and/or a business entity. Examples of business entities include merchant sites, resource information sites, utility sites, real estate management sites, social networking sites, etc., which offer various items for purchase and process payments for the purchases.

The user device 110, in various embodiments, may be implemented using any appropriate combination of hardware and/or software configured for wired and/or wireless communication over the network 190. In various implementations, the user device 110 may include at least one of a wireless cellular phone, wearable computing device, PC, laptop, etc.

The user device 110, in one embodiment, includes a user interface (UI) application 112 (e.g., a web browser), which may be utilized by the user 140 to conduct electronic transactions (e.g., selling, shopping, purchasing, bidding, etc.) with the service provider server 130 or request services (e.g. credit cards, loans, etc.) from the service provider server 130 over the network 190. In one implementation, the user interface application 112 includes a software program, such as a graphical user interface (GUI), executable by a processor that is configured to interface and communicate with the service provider server 130 via the network 190. In another implementation, the user interface application 112 includes a browser module that provides a network interface to browse information available over the network 190. For example, the user interface application 112 may be implemented, in part, as a web browser to view information available over the network 190.

The user device 110, in various embodiments, may include other applications 116 as may be desired in one or more embodiments of the present disclosure to provide additional features available to the user 140. For example, the applications 116 may include security applications for implementing client-side security features, programmatic client applications for interfacing with appropriate application programming interfaces (APIs) over the network 190, and/or various other types of generally known programs and/or software applications. In still other examples, the other applications 116 may interface with the user interface application 112 for improved efficiency and convenience.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

Even though only one user device 110 is shown in FIG. 1, it has been contemplated that one or more user devices (each similar to user device 110) may communicate with other components via the network 190 within the system 100.

The service provider server 130, in one embodiment, may be maintained by an online service provider, which may provide services (e.g., selling of merchandise processing, performing electronic transactions, banking services, etc.). As such, the service provider server 130 may include a service application 138, which may be adapted to interact with the user devices (such as the user device 110) over the network 190 to facilitate the searching, selection, purchase, payment of items, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page, and may be configured to serve the log-in page to users for logging into user accounts of the users to access various service provided by the service provider server 130. The web server 134 may also include other webpages associated with the different services offered by the service provider server 130. As a result, a user (e.g., the user 140) may access a user account associated with the user and access various services offered by the service provider server 130, by generating HTTP requests directed at the service provider server 130.

The service provider server 130, in one embodiment, may be configured to maintain one or more user accounts (e.g., a buyer account, a seller account, etc.) in an accounts database 136, each of which may include account information associated with one or more users (e.g., the user 140 associated with user device 110). For example, account information may include private financial information of users and merchants, such as one or more account numbers, passwords, credit card information, banking information, digital wallets used, transaction history, or other types of financial information. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130 (e.g., in the accounts database 136), and the user may have credentials to authenticate or verify identity with the service provider server 130. Credentials may include an e-mail address or username, and a password. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130.

The service provider server 130 may also include an account tagging module 160. The account tagging module 160 may tag user account records (e.g., records stored in the accounts database 136) with one or more characteristics to aid the service provider in making determinations related to the user. For example, the account tagging module 160 may tag user account records with indications that the user is a credit risk (e.g., that the user poses a high risk of defaulting an on obligation or becoming delinquent) or fraud risk (e.g., that the user poses a high risk of performing fraudulent transactions), or that the user has high creditworthiness or is highly likely to respond positively to messages offering products or services to the user. The account tagging module 160 may be scheduled to tag user accounts and update tags regularly (e.g., as part of a recurring task). Other components of the service provider server 130 may use the tags stored by the account tagging module 160 when determining, for example, whether to extend credit to the user 140, increase the user's credit limit, or send offers to the user 140.

Figure 2:
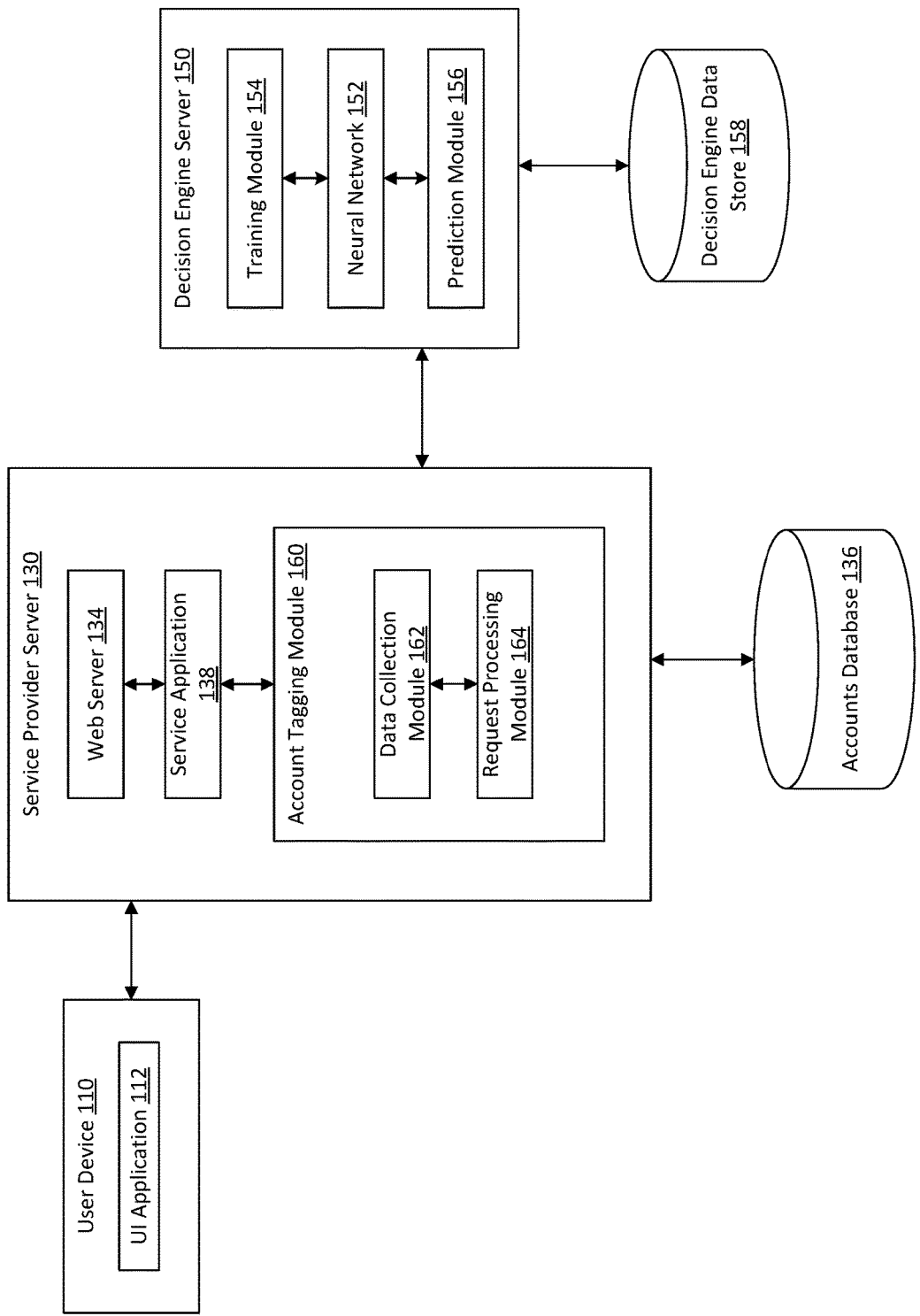
FIG. 2 is a block diagram illustrating an account tagging module according to an embodiment of the present disclosure.

FIG. 2 illustrates a block diagram, in more detail, of the system 100 interacting with the account tagging module 160 according to an embodiment of the disclosure. The account tagging module 160 includes a data collection module 162 and a request processing module 164, and may communicate with the decision engine server 150 to determine whether to tag a user account record and with the accounts database 136 to tag a user account record.

The data collection module 162 may retrieve user account records from the accounts database 136 and transmit data from the records to the decision engine server both for use in training the neural network 152, and for determining whether a user account record should be tagged. For each record, the data collection module 162 may extract data relevant to the tagging determination and structure it for transmission to the decision engine server 150 (e.g., in JavaScript Object Notation (JSON) format). The data for each record may include an account ID which can be used to associate the data with the account record from which it was extracted. For example, the tagging determination may rely on the number of credit cards the user has registered with the service provider and transactions the user has performed using the service provider. When preparing to send data to the decision engine server 150 for training the neural network 152 or determining whether to tag accounts, the data collection module 162 may extract the credit card data and transaction data for each account to be used or tagged from the accounts database 136, aggregate the data over different time intervals into a time series (e.g., by summing the values of all transactions in a week over a 52-week period), then structure the data for transmission to the decision engine server 150. The structured data may be sent to the decision engine server 150 individually (e.g., one transmission per account) or as a batch (e.g., multiple accounts per transmission).

For example, a number of user account records in the accounts database 136 may be associated with a characteristic with which the account tagging module 160 is configured to tag other user accounts. The accounts database 136 may retrieve each of those user account records from the accounts database 136 and combine them with other records not associated with the characteristic to use as training data for the neural network 152. The data collection module 162 may structure the training data as described above and transmit it to the decision engine server 150 with a request to train the neural network 152. For example, if configuring the neural network 152 to predict the likelihood of a user defaulting on an obligation, the account tagging module 160 may retrieve user account records from the accounts database 136 for users whom have already defaulted on an obligation. The data collection module 162 may combine relevant data (corresponding to features of the neural network 152) from those records with relevant data from other records for which no obligation has been defaulted on and transmit the data to the decision engine server 150 for training the neural network 152.

The data collection module 162 may also schedule periodic tagging of user accounts. For example, the data collection module 162 may initiate a process to tag user accounts at a specified interval (e.g., daily). The data collection module 162 may extract relevant data (e.g., data corresponding to features of the neural network 152) from the accounts database 136 and transmit the data as part of a request to the decision engine server 150. The request may include the account data and an indication of what tag (or characteristic) the decision engine server 150 should make a determination for. After the decision engine server 150 has processed the data, the data collection module 162 may receive a response from the decision engine server indicating which accounts should be tagged. For example, the response may include a list of account IDs belonging to accounts which should be tagged with a tag or characteristic indicated in the request, or a list of accounts with entries in the list indicating what tags should be applied to the corresponding account.

The request processing module 164 may receive requests for information on whether user accounts are tagged or should be tagged with characteristics relevant to a determination regarding the user 140. The request processing module 164 may respond to those requests based on tags indicated in user account records or based on responses from the decision engine server 150. For example, the service application 138 may be determining whether a credit line increase should be offered to a user. The user 140 may have requested the increase for an account associated with the user device 110 (e.g., through a request to the web server 134 from UI application 112), or the service provider may periodically offer credit line increases to users and have request the determination without any action by the user 140. The service application 138 may request information from the request processing module 164 regarding tags that would be relevant to its determination (e.g., tags indicating the user poses a high credit risk). The request processing module 164 may retrieve the account record corresponding to the user 140 from the accounts database 136 and determine whether the account record is tagged with a relevant characteristic. The request processing module 164 may respond to the request with a response indicating whether any relevant tags are present in the account record of the user 140. Alternately, the request processing module 164 may determine the user's account record has not been processed for tagging (or that the account should be reprocessed for tagging) and communicate with the data collection module 162 to have the account record processed (e.g., tagged or not tagged) as described above. The request processing module 164 may then respond to the request based on whether the account record was tagged by the data collection module 162.

The decision engine server 150 is configured to determine whether user account records should be tagged and includes a neural network 152 (illustrated in detail in FIG. 3), a training module 154, and a prediction module 156. The decision engine server may communicate with the decision engine data store 158, which stores account data received from the service provider server 130 (e.g., from the data collection module) for processing. Neural network 152 may be an LSTM neural network. Neural network 152 may be configured to accept as input time series data from a user account and output a predictive value indicating the likelihood of an event associated with the user (e.g., defaulting on an obligation or responding to an offer). The time series data may be fed to the neural network 152 as a matrix, where rows of the matrix correspond to time intervals (e.g., days, weeks, months, etc.), and columns represent features (e.g., transaction amounts, number of transactions, etc.). Each element of the matrix may correspond to an aggregate value of the feature computed over the time interval (e.g., total amount spent in transactions in a week). For simplicity, a single neural network 152 is illustrated, but the decision engine server 150 may maintain multiple neural networks 152, each configured to predict the likelihood of a different event.

The training module 154 may receive data (e.g., time series data from the data collection module 162) corresponding to various user accounts in the accounts database 136 for use in training the neural network 152. The data corresponds to account records for which the characteristic (i.e., tag) the neural network 152 is being trained to predict is known. The time series data may be compiled into a matrix as described above and fed to the neural network 152 for training.

The prediction module 156 may receive and process requests for predictions regarding events associated with a user from the service provider server 130. As discussed when describing the data collection module 162, each request may indicate the event or characteristic (e.g., tag) to be predicted, and time series data corresponding to the account (or accounts, if the request includes a batch of account data) for which the prediction is sought. The time series data for each account may be compiled into a matrix as described above and fed to the neural network 152 to obtain a predictive value indicating the likelihood of the event or characteristic (e.g., defaulting on an obligation or opening a message). The predictive value may be a number between 0 and 1 and may be compared to a threshold value. Based on the result of the comparison to the threshold value, the prediction module 156 may determine whether the user account should be tagged. The prediction module 156 may transmit the determination in a response to the service provider server 130. For example, when responding to a request including a batch of account data, the prediction module 156 may return a list of account IDs corresponding to accounts which should be tagged with the characteristic, or a list of account IDs with a list of tags for each account ID. For a request including data for a single account, the prediction module 156 may respond with the account ID and an indication of whether the account corresponding with the account ID should be tagged, or a list of tags with which the account should be tagged.

Figure 3:
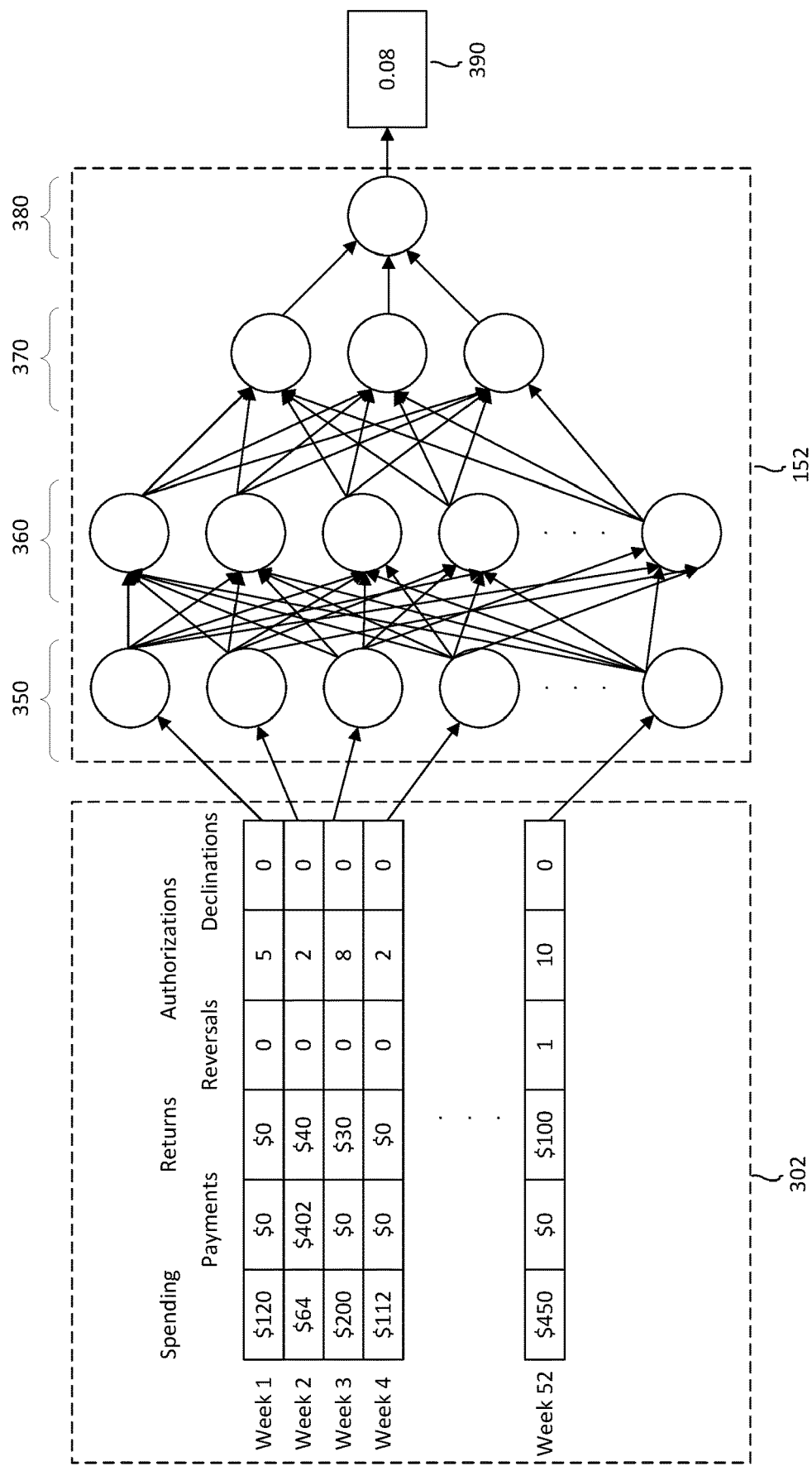
FIG. 3 illustrates a sample matrix of time series data being processed by a neural network to generate a value predictive of an event associated with a user according to various embodiments of the present disclosure.

FIG. 3 illustrates a sample matrix 302 of time series data being processed by neural network 152 to generate a value 390 predictive of an event associated with a user 140 or user account according to various embodiments of the present disclosure. The sample matrix 302 and sample neural network 152 are illustrative only. In practice, the matrix 302 can have a different number of rows and columns, and the neural network 152 may have a different number of layers and nodes. The matrix 302 may be created from time series data received by the decision engine server 150 (e.g., by the prediction module 156) from the service provider server 130, and the time series data may reflect credit card usage information by a user 140. The sample neural network 152 may be configured to output a predictive value 390 predicting the likelihood of the user 140 being a credit risk (e.g., defaulting on an obligation or becoming delinquent), and may be trained as described with respect to FIG. 2. The matrix 302 includes six columns, one for each feature—spending, payments, returns, reversals (also known as chargebacks), authorizations, and declinations—considered by the sample neural network 152. The time series data includes data aggregated by week for 52 weeks. Each value in the matrix 302 represents an aggregate value for a time interval (one week in this example). For example, in week 2, the user 140 spent a total of $64 on purchases, made $402 in payments (which may reflect payments for charges incurred before the time period included in the time series data), received $40 in returns, initiated no reversals, had 8 purchases authorized, and had no purchases declined. Before being fed to the input layer 350 of the neural network 152, the data may be standardized (not illustrated) so that each value in the matrix is converted to a value between 0 and 1. For example, each value in the matrix 302 may be standardized by subtracting the arithmetic mean of corresponding aggregate values from a set of training data and dividing the result by the standard deviation of the corresponding aggregate values from the training data.

After standardization, the matrix 302 may be fed to the input layer 350 of the neural network 152, which may be an LSTM neural network. Each intermediate layer 360 and 370 (also known as hidden layers) may be a dense layer (e.g., every node of the dense layer receives input form every node of the previous layer). The output layer 380 of the neural network 152 may generate a predictive value 390 indicating the likelihood of an event or characteristic associated with a user 140, in this example, the likelihood of the user being a credit risk. In this example, the predictive value 390 indicates a likelihood of 0.08 that the user 140 is a credit risk. The predictive value 390 may be compared to a threshold value, and the user's account may be tagged or not tagged based on the result of the comparison. For example, the threshold value for tagging the user account with an indication the user is a credit risk may be 0.30. Since the 0.08 (the predictive value 390) is less than 0.30 (the threshold), the prediction module 156 may indicate to the service provider server 130 that the user's account should not be tagged. If the tag, however, represented a low likelihood of being a credit risk (for example, for use in making credit card application approvals or credit increase approvals), the tag may be appropriate when the predictive value 390 is at or below a threshold, for example, 0.10. In that case, since 0.08 is less than 0.10, the prediction module 156 may respond to the service provider server 130 with an indication that the user's account should be tagged as being a low credit risk.

In some embodiments, the predictive value 390 may be reported to the service provider server 130 in the response, and the service provider server 130 may store the predictive value 390 in the user's account record in the accounts database 136. The predictive value may then be used as an additional feature in other determinations or models. Furthermore, the output of intermediate layers 360 and 370 may be useful as features for other models as well and may also be reported in the response to the service provider server 130, and/or stored in the decision engine data store for future use. For example, the output of intermediate layer 370 may provide 3 intermediate features (based on combinations of the original 6 features illustrated in the matrix 302), one for each node in the intermediate layer 370.

While the procedure illustrated by FIG. 3 demonstrates the neural network 152 making a financial prediction used by the service provider server 130 to tag a user's account and make credit determinations, embodiments of the present disclosure are applicable to any type of time series data for which predictions and determinations based on those predictions are desired. For example, the service provider may have time series data related to user engagement with communications from the service provider. The matrix 302 may have columns corresponding to the number of messages sent to the user, the number of messages read by the user, the number of times the user followed a link in a message, the average amount of time that elapsed between a message being sent and the message being read by the user (for messages that were read), and rows corresponding to months. The neural network 152 may be configured to output a predictive value 390 based on the matrix 302, indicating the likelihood of the user responding to future messages from the service provider. The predictive value 390 may be compared to a threshold value corresponding to a desired level of responsiveness, and the user's account may be tagged with an indication that the user is highly responsive to messages (or, as one alternative, that the user is unlikely to engage with the service provider through messages sent by the service provider). Based on the tag, the service provider may determine whether and how frequently to send messages to the user in the future. As another example, the matrix 302 may contain time series data corresponding to login attempts per day from an IP address or device identifier (e.g., number of attempts, number of successful attempts, number of different accounts for which attempts were made, etc.) and the neural network 152 may be configured to predict the likelihood of a user account being associated with fraud. Based on a comparison between the prediction (through predictive value 390) and a threshold, the system may tag accounts as being associated with fraudulent activity (e.g., perpetrating fraud or being the victim of fraud) and act accordingly (e.g., suspending an account or requiring a password reset).

Figure 4:
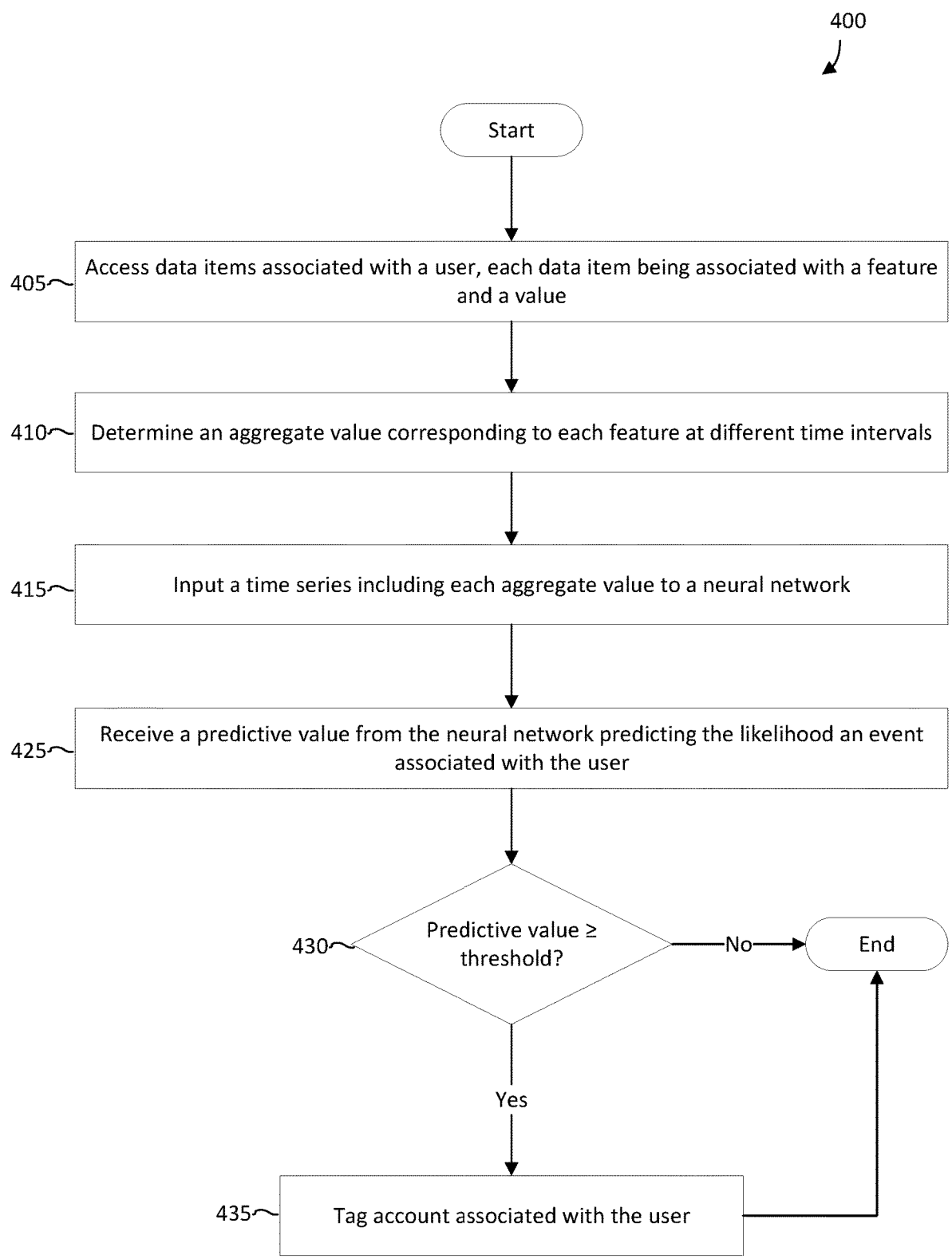
FIG. 4 is a flowchart showing a process of tagging a user account in an online system based on a predictive value indicating the likelihood of an event.

FIG. 4 illustrates a process 400 for tagging a user account in an online system based on a predictive value indicating the likelihood of an event. In some embodiments, the process may be performed by an account tagging module 160. Note that one or more of the steps may be combined, omitted, or performed in a different order in different embodiments.

At step 410, the process 400 may access data associated with a user (e.g., using the data collection module 162). The data may be based on historical data related to interactions between the user and the service provider. For example, data may include transaction information (e.g., purchases, refunds), credit card information (e.g., number of credit cards owned by the user, credit limits), loan information, user metrics (e.g., number of messages transmitted to the user, number of messages read by the user, number of visits to the service provider's web site, etc.). Data may be associated with a feature (e.g., purchase, return, payment, etc.) and data value (also referred to as data item value) (e.g., the value of the purchase, return, or payment).

At step 410, the process 400 (e.g., using the data collection module 162) may determine aggregate values for a set of features based on the data. For example, the set of features may include a number of transactions (e.g., how many purchases or refunds the user completed), a transaction amount (e.g., the value of each purchase or refund), a number of payments, a payment amount, a number of reversed charges (also known as chargebacks), a reversed charge amount, a number of payment authorizations (i.e., the number of times a charge was accepted by the service provider), and/or a number of payment declinations (i.e., the number of times a charge was rejected by the service provider). An aggregate value may combine the value of each data associated with the feature over a time interval. For example, one aggregate value may be the sum of all purchases in a week or the average amount (e.g., arithmetic mean) spent per day over a week, and another aggregate value be the number of payment authorizations in a week. Each aggregate value may be standardized by subtracting the arithmetic mean of corresponding aggregate values from a set of training data and dividing the result by the standard deviation of the corresponding aggregate values from the training data. The process 400 may then combine the aggregate values in time series data. For example, the aggregate values may be computed at 1-week intervals (to obtain, for example, the total amount spent on purchases in a week, or the number of times a credit card was used in a week), and the time series data may include 52 weeks of data.

At step 415, the process 400 (e.g., using the prediction module 156) may input the time series data to an input layer of a neural network 152. The time series data may be structured as a matrix, as illustrated in FIG. 3. Each column of the matrix may represent a feature of the of one or more features, and each row of the matrix may correspond to a time interval. For example, if the time series data includes weekly data over a 52-week period, the first row of the matrix corresponds to week 1 (out of 52 weeks), and each column of the first row stores an aggregate value for a feature, computed over the first 1-week period. In some instances, the rows and columns of the matrix may also be reversed so that the columns correspond to time intervals and the rows correspond to features.

In some embodiments, the neural network 152 may be an LSTM neural network, and intermediate or hidden layers of neural network 152 may be dense (e.g., every node of a dense layer receives input from every node of the previous layer), as illustrated in FIG. 3. The neural network 152 may be trained using account records which have already been tagged (e.g., by a human or an automated system) as a result of the event which neural network 152 is configured to predict having already occurred. To train the neural network 152, the process 400 may compile a plurality of records (e.g., using the data collection module 162), each associated with a user account that has been tagged (e.g., by a human or an automated process) with a characteristic (e.g., high credit risk, low credit risk, highly responsive to marketing communications, etc.) associated with the predictive value. For each record, the process 400 may determine aggregate values for different features over time intervals based on data associated with the record, as described above, to create time series data. The process 400 may then feed the time series data (e.g., using the training module 154) to the neural network for training, along with time series data corresponding to user accounts which have not been tagged with the characteristic.

At step 425, the process 400 (e.g., using the prediction module 156) may receive from the output layer of the neural network 152 a predictive value predicting the likelihood of an event associated with the user. For example, the predictive value may predict the likelihood of the user defaulting on an obligation or becoming delinquent, or the likelihood of the user being associated with fraudulent activity, or the likelihood of the user opening or responding to a message. The predictive value may be a number between 0 and 1, with 0 corresponding to the lowest likelihood of the event occurring, and 1 corresponding to the highest likelihood.

At step 430, the process 400 may determine whether the predictive value is at or above a threshold. If not, the process 400 ends. If the predictive value is at or above the threshold, the process proceeds to step 435. For some events, the process 400 may instead determine whether the predictive value is at or below a threshold. For example, if the process 400 is configured to tag users as having minimal credit risk and the neural network 152 is predicting the likelihood of the user 140 defaulting or becoming delinquent on an obligation, the process may proceed to step 435 if the predictive value is at or below a threshold.

At step 435, the process 400 (e.g., using the data collection module 162) may tag the user account (e.g., the user account record stored in the accounts database 136) with an indication that the predictive value is at or above the threshold, or if the comparison at step 430 is instead based on the predictive value being at or below the threshold, with an indication that the predictive value is at or below the threshold. For example, the user's account may be tagged as being a high credit risk or a low credit risk, or as being likely or unlikely to respond to e-mail offers. In some embodiments, the predictive value may also be used as an additional feature in other determinations or models. Furthermore, the output of intermediate layers of the neural network may also be used as features in other determinations or models. For example, the output of each node of the intermediate layer of the neural network 152 preceding the output layer may represent a specific combination of the features included as input to the neural network 152. The outputs of these intermediate nodes may be used as features for a different neural network 152 or predictive model.

In some embodiments, the service provider server 130 may subsequently receive a user request (e.g., via the request processing module 164) and decide whether to accept or reject the request based on the existence or absence of a tag. For example, the account belonging to the user 140 may have been tagged as being a credit-risk using the process 400. If the user 140 makes a request for loan, the system may check the account record of the user to determine whether the user has been tagged as a credit risk. If so, the service provider server 130 may decline user's request for a loan or take another action, such as requesting additional information or reducing the loan or credit amount. In some embodiments, the system may use the predicative value directly to make the determination. For example, the system may compute the predictive value as described above upon receiving a user request and determine whether to accept or reject the request based on whether the predictive value is at or above a threshold, even if the account has not been tagged with the characteristic associated with the predictive value. In such cases, the system may optionally tag the user's account once it has determined whether the predictive value is at or above the threshold.

In some embodiments, the process 400 may be scheduled by the account tagging module 160 to run periodically (e.g., daily or weekly) or at certain times (e.g., during high volume transaction periods, such as Christmas, Black Friday, Cyber Monday, and the like) to keep tags on user account records up to date. The times may also be dependent upon the particular user, such as during a birthday or anniversary of a relative, when the user is expected to make higher than normal purchases (volume and/or price). The process 400 may also run on-demand, for example, when a request (e.g., for a loan, credit card, etc.) is received by the service provider server 130 from a user 140 for which the tag would be relevant.

FIG. 5 is a block diagram of a computer system 500 suitable for implementing one or more embodiments of the present disclosure, including the service provider server 130 and the user device 110. In various implementations, the user device 110 may include a mobile cellular phone, personal computer (PC), laptop, wearable computing device, etc. adapted for wireless communication, and the service provider server 130 may include a network computing device, such as a server. Thus, it should be appreciated that the devices 110 and 130 may be implemented as the computer system 500 in a manner as follows.

The computer system 500 includes a bus 512 or other communication mechanism for communicating information data, signals, and information between various components of the computer system 500. The components include an input/output (I/O) component 504 that processes a user (i.e., sender, recipient, service provider) action, such as selecting keys from a keypad/keyboard, selecting one or more buttons or links, etc., and sends a corresponding signal to the bus 512. The I/O component 504 may also include an output component, such as a display 502 and a cursor control 508 (such as a keyboard, keypad, mouse, etc.). The display 502 may be configured to present a login page for logging into a user account or checkout page for purchasing an item from a merchant. An optional audio input/output component 506 may also be included to allow a user to use voice for inputting information by converting audio signals. The audio I/O component 506 may allow the user to hear audio. A transceiver or network interface 520 transmits and receives signals between the computer system 500 and other devices, such as another user device, a merchant server, or a service provider server via network 522. For example, the network interface 520 may transmit or receive requests from the user for products or services offered by the service provider. In one embodiment, the transmission is wireless, although other transmission mediums and methods may also be suitable. A processor 514, which can be a micro-controller, digital signal processor (DSP), or other processing component, processes these various signals, such as for display on the computer system 500 or transmission to other devices via a communication link 524. The processor 514 may also control transmission of information, such as cookies or IP addresses, to other devices.

The components of the computer system 500 also include a system memory component 510 (e.g., RAM), a static storage component 516 (e.g., ROM), and/or a disk drive 518 (e.g., a solid-state drive, a hard drive). The computer system 500 performs specific operations by the processor 514 and other components by executing one or more sequences of instructions contained in the system memory component 510. For example, the processor 514 can perform the prediction and tagging functions described herein according to process 400.

Logic may be encoded in a computer readable medium, which may refer to any medium that participates in providing instructions to the processor 514 for execution. Such a medium may take many forms, including but not limited to, non-volatile media, volatile media, and transmission media. In various implementations, non-volatile media includes optical or magnetic disks, volatile media includes dynamic memory, such as the system memory component 510, and transmission media includes coaxial cables, copper wire, and fiber optics, including wires that comprise the bus 512. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 500. In various other embodiments of the present disclosure, a plurality of computer systems 500 coupled by the communication link 524 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
    a non-transitory memory; and
    one or more hardware processors coupled with the non-transitory memory and configured to read instructions from the non-transitory memory to cause the system to perform operations comprising:
        accessing data associated with a user, the data being associated with a value for previous transactions conducted by the user;
        accessing a neural network trained for predicting likelihoods of events occurring based on a model training using training data for a plurality of features from previous aggregate values from the previous transactions;
        determining, for a set of one or more features of the plurality of features, an aggregate value, based on the data, for each feature of the set at one or more time intervals;
        structuring a data table comprising time series data having the aggregate value for each feature and the one or more time intervals, wherein the data table is usable at an input layer of the neural network, and wherein the structuring comprises:
            adding the aggregate value for each feature to the data table for the one or more time intervals over which the data for each feature is available, wherein the adding to the data table causes the data table to be structured for the input layer based on the model training;
        inputting, by a decision engine, the time series data including the aggregate value for each feature to the input layer of the neural network;
        generating, at an output layer of the neural network based on the model training, a predictive value indicating a predicted likelihood of an event occurring in association with the user;
        tagging the user with a characteristic based on the predictive value and a first threshold value associated with the predicted likelihood of the event, wherein the characteristic is indicative of a risk of the event occurring with the user based on predictive value generated by the neural network;
        executing, automatically without user input, an action responsive to a request of the user for a use of a digital account in association with the event, wherein the action prevents the use of the digital account or enables the use of the digital account;
        generating, using the neural network, a combination of features that includes the predictive value from the output layer;
        inputting the combination of features to a separate neural network different from the neural network, wherein the separate neural network utilizes the predictive value in the combination of features in place of the time series data;

generating an output of the separate neural network based on the inputting the combination of features; and updating the action based on the output of the separate neural network and a second threshold value associated with the predicted likelihood of the event.

2. The system of claim 1, the operations further comprising:

storing a tag indicating the predictive value is at or above the first threshold or the second threshold in an account record associated with the user.

3. The system of claim 1, the operations further comprising:

receiving the request from the user in association with the use of the digital account with a merchant, for a loan request, or for an amount of credit, wherein the action comprises accepting or rejecting the request.

4. The system of claim 1, wherein the neural network is a long short-term memory (LSTM) neural network.

5. The system of claim 1, wherein the predictive value indicates a likelihood of the user defaulting on an obligation.

6. The system of claim 1, wherein the predictive value indicates a likelihood of the user responding to a message.

7. The system of claim 1, wherein the predictive value indicates a likelihood of the user being associated with a fraudulent activity.

8. The system of claim 1, wherein the plurality of features includes at least one of a transaction amount or a payment amount.

9. A method, comprising:

accessing one or more data items associated with a user, each data item of the one or more data items being further associated with a data item value;

determining a neural network trained for predicting likelihoods of events occurring based on a model training using training data for a plurality of features from previous aggregate values for past data item values;

determining, for a set of one or more features of the plurality of features, an aggregate value, based on the one or more data items, for each feature of the set at one or more time intervals;

structuring a data table comprising time series data having the aggregate value for each feature and the one or more time intervals, wherein the data table is usable at an input layer of the neural network, and wherein the structuring comprises:

adding the aggregate value for each feature to the data table for the one or more time intervals over which the data item for each feature is available, wherein the adding to the data table causes the data table to be structured for the input layer based on the model training;

inputting each aggregate value to the input layer of the neural network;

generating, at an output layer of the neural network based on the model training, a predictive value associated with a likelihood of an event occurring with the user; and tagging the user with a characteristic based on the predictive value and a first threshold value associated with the likelihood of the event, wherein the characteristic is indicative of a risk of the event occurring with the user based on the predictive value generated by the neural network;

executing, automatically without user input, an action responsive to a request of the user for a use of a digital account in association with the event, wherein the action prevents the use of the digital account or enables the use of the digital account;

generating, using the neural network, a combination of features that includes the predictive value from the output layer;

inputting the combination of features to a separate neural network different from the neural network, wherein the separate neural network utilizes the predictive value in the combination of features in place of the time series data;

generating an output of the separate neural network based on the inputting the combination of features; and updating the action based on the output of the separate neural network and a second threshold value associated with the likelihood of the event.

10. The method of claim 9, wherein the inputting of each aggregate value comprises:

populating a matrix, each column of the matrix representing a feature of the set of one or more features and each row of the matrix corresponding to a time interval of the one or more time intervals, wherein each element of the matrix is populated by the aggregate value corresponding to the feature represented by the row and the time interval represented by the column at which the element is located; and inputting the matrix to the input layer of the neural network.

11. The method of claim 9, further comprising:

compiling, from a database, a plurality of records, each record corresponding to a user account tagged with a characteristic, wherein the characteristic is associated with the predictive value;

determining, for each record of the plurality of records, an aggregate value, based on one or more data items associated with the record, for each feature of the set of one or more features at one or more time intervals associated with the record; and training the neural network using the aggregate values based on the one or more data items associated with each record of the plurality of records.

12. The method of claim 9, further comprising:

storing an indication indicating the predictive value or the output is at or above the first threshold or the second threshold in an account record associated with the user.

13. The method of claim 9, further comprising:

receiving the request from the user in association with the use of the digital account with a merchant, for a loan request, or for an amount of credit, wherein the action comprises accepting, rejecting, or modifying the based on the predictive value or the output, whether to accept, reject, or modify the user request.

14. The method of claim 9, wherein the aggregate value for a feature at a time interval is a sum of every data item value associated with a data item associated with the feature, for every data item for which a time associated with the data item is within the time interval.

15. The method of claim 9, wherein the aggregate value for a feature at a time interval is a number of data items associated with the feature, for every data item for which a time associated with the data item is within the time interval.

16. The method of claim 9, wherein the aggregate value for a feature at a time interval is an arithmetic mean of every data item value associated with an data item associated with the feature, for every data item for which a time associated with the data item is within the time interval.

17. A non-transitory machine-readable medium having stored thereon machine-readable instructions executable to cause a machine to perform operations comprising:
- accessing data associated with a user, the data being further associated with a data value;
- accessing a neural network trained for predicting likelihoods of events occurring based on a model training using training data for a plurality of features from previous aggregate values from previous transactions;
- determining, for a set of one or more features of the plurality of features, an aggregate value, based on the data, for each feature of the set over one or more time intervals;
- structuring a data table comprising time series data having the aggregate value for each feature and the one or more time intervals, wherein the data table is usable at an input layer of the neural network, and wherein the structuring comprises:
  - adding the aggregate value for each feature to the data table for the one or more time intervals over which the data for each feature is available, wherein the adding to the data table causes the data table to be structured for the input layer based on the model training;
- inputting the time series including each aggregate value for each feature to the input layer of the neural network, wherein the neural network is configured to produce a predictive value a indicating a predicted likelihood of an event occurring in association with the user;
- generating, at an output layer of the neural network based on the model training, the predictive value;
- tagging the user with a characteristic based on the predictive value and a first threshold value associated with the predicted likelihood of the event, wherein the characteristic is indicative of a risk of the event occurring with the user based on predictive value generated by the neural network;
- executing, automatically without user input, an action responsive to a request of the user for a use of a digital account in association with the event, wherein the action prevents the use of the digital account or enables the use of the digital account; and
- storing a tag indicating the predictive value is at or above the threshold in an account record associated with the user.

18. The non-transitory machine-readable medium of claim 17, the operations further comprising:
- receiving the request from the user in association with the use of the digital account with a merchant, for a loan request, or for an amount of credit, wherein the action comprises accepting, rejecting, or modifying the request.

19. The non-transitory machine-readable medium of claim 17, wherein the plurality of features includes at least one of a number of transactions or a number of payments.

20. The non-transitory machine-readable medium of claim 17, the operations further comprising:
- standardizing each aggregate value.

\* \* \* \* \*